United States Patent [19]

Williams

[11] 4,033,426
[45] July 5, 1977

[54] APPARATUS FOR STEERING TRAILER VEHICLES

[76] Inventor: Eugene J. Williams, 109 Detroit Ave., Trenton, Mich. 48183

[22] Filed: Jan. 15, 1976

[21] Appl. No.: 649,529

[52] U.S. Cl. .............................. 180/79.1; 280/419
[51] Int. Cl.² .......................................... B62D 5/04
[58] Field of Search .......... 280/404, 442, 443, 464, 280/465, 468, 469, 470, 419, DIG. 9; 180/79.1, 79.3, 148; 318/446

[56] References Cited

UNITED STATES PATENTS

| | | | |
|---|---|---|---|
| 1,820,764 | 8/1931 | Abt | 318/446 |
| 2,070,832 | 2/1937 | Johnson | 180/79.1 |
| 3,856,101 | 12/1974 | Allison | 180/148 |

*Primary Examiner*—Joseph F. Peters, Jr.
*Assistant Examiner*—R. Schrecengost
*Attorney, Agent, or Firm*—Burton, Parker & Schramm

[57] ABSTRACT

Relates to steering apparatus for trailers having pivoted wheels and towed by motor vehicles, the steering provision being a reversible electric motor carried by each such trailer. The power for the electric motor is derived from a battery or other source of electric power carried by the towing vehicle and the control of which is located in the towing vehicle and performed by the operator of the towing vehicle. An electric circuit is connected at one end to the battery in the towing vehicle and at the other end to the electric motor in the trailer. A three-position switch is incorporated in the circuit for controlling the operation of the motor and is preferably mounted on the steering column of the towing vehicle convenient to the operator. The electric motor is carried on the axle for a pair of pivoted wheels and acts through gearing to move a bar paralleling the axle in one or the opposite direction of its longitudinal dimension, the opposite ends of the bar being coupled to the pair of pivoted wheels to effect their turning movement in one or the opposite direction according to the direction of rotation of the motor.

8 Claims, 6 Drawing Figures

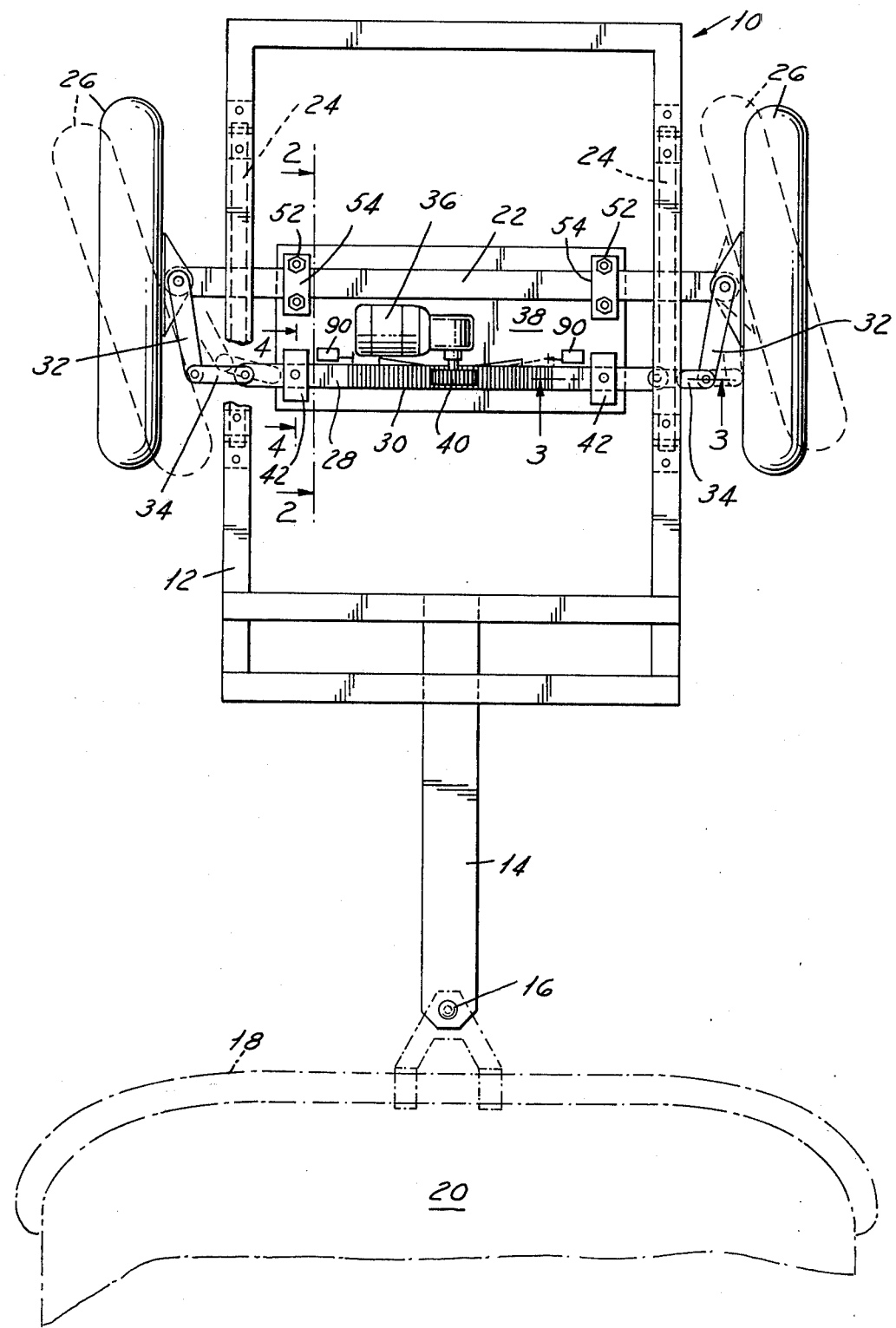

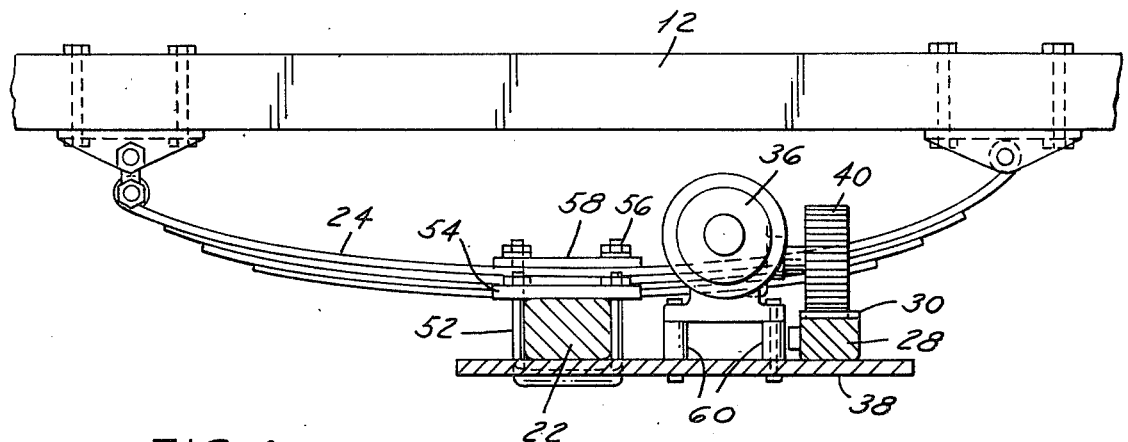
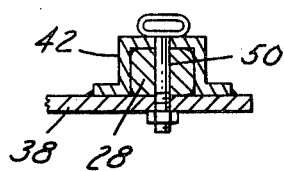
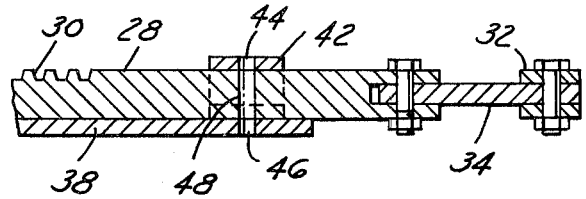
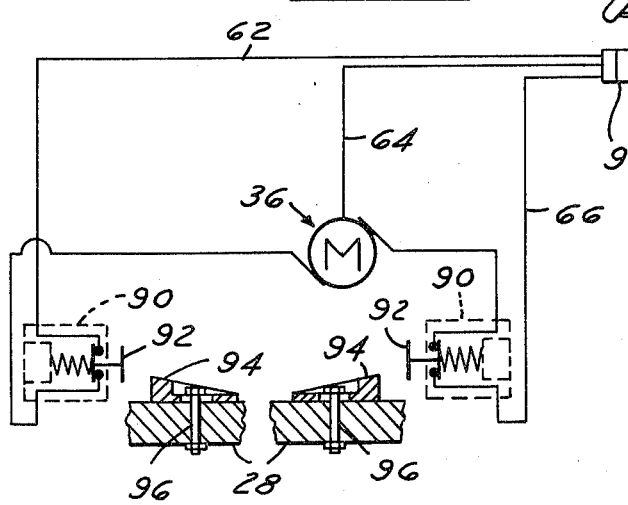
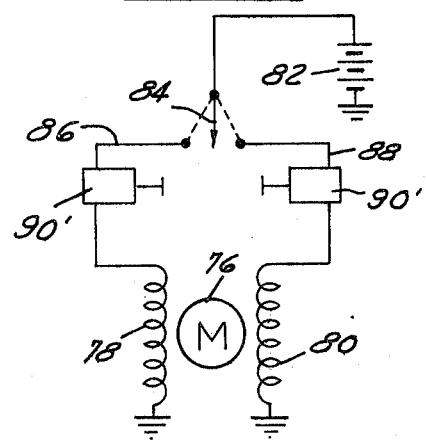

APPARATUS FOR STEERING TRAILER VEHICLES

BACKGROUND OF THE INVENTION

This invention relates to steering apparatus for trailer vehicles having steerable wheels and to employing electrical power derived from a self operable vehicle employed for towing and steering such trailers.

Many forms of apparatus have been suggested by prior workers in this art for guiding and steering trailers from towing vehicles including such combinations where the controls and the power therefore have been derived from the towing vehicles. So far as applicant is aware, these devices have utilized mechanical or hydraulic power sources to accomplish the steering operations and exemplary of such are the respective U.S. Pat. Nos. to Dinkel et al. No. 2,929,642 and Pietroria No. 3,212,793. Such devices have been relatively expensive to construct and maintain and contain complicatedly assembled parts which have been easily damaged or otherwise impaired in usage. In view of these difficulties and problems, it is apparent that improvements are needed in the art and especially in the direction of simpler, easier to control and more rugged type of apparatus.

SUMMARY OF THE INVENTION

Accordingly, an important object of the invention is to provide an improved steering mechanism for trailer type vehicles which overcomes the aforementioned difficulties and problems encountered heretofore in the art to which this invention relates.

Another important object of the invention is to provide an improved steering apparatus for trailer vehicles which employs a reversible electrical motor for operating the steering wheels of the trailer and improved mechanism for using the torque of the motor for applying force to turn the steering wheels.

A further important object of the invention is to provide an improved steering apparatus for trailer type vehicles having as the force applying means a reversible electric motor and a control circuit therefore which utilizes the source of electric power in the towing vehicle for operating the motor and which enables the steering apparatus in the trailer to be controlled from the operator's seat in the towing vehicle.

A further important object of the invention is to provide self operable means associated with the aforesaid electric motor for automatically limiting the rotation thereof in either direction in order to prevent overtravel of the movable parts of the steering mechanism and accomplishing this object without effecting the ability of the electric motor to reverse its rotation and return the movable parts of the steering mechanism towards its straight-ahead position.

A still further object of the invention is to provide an improved steering apparatus for trailer vehicles which is rugged and durable in usage and which is economical to construct, assemble and maintain.

The objects of the invention are effectively and efficiently carried out with the cooperation of the parts of the apparatus forming the reversible electromechanical device for turning the steerable wheels of the trailer vehicle and also the cooperation of the parts making up the electric circuit for transmitting and directionally controlling the flow of electrical energy from the electrical power source in the towing vehicle to the aforesaid electromechanical device. More specifically, a reversible electric motor is carried by the trailer vehicle, and particularly secured to the axle of the trailer to which the steerable wheels are pivoted. Gear reduction means is associated with the motor for converting the reversible torque thereof into straight-line reciprocal motion of a drive bar paralleling the axle and connected by appropriate mechanical linkages to the pivoted wheels for turning the same in unison toward one or the other side of the trailer. The electric motor is connected by a circuit to an electric power source in the towing vehicle, such as a conventional 12 volt battery associated electrically with the internal combustion engine of the towing vehicle. Switch means, preferably located on the steering column of the towing vehicle, provides reversible current flow through the circuit for causing the motor to turn the trailer steering wheels in one or the opposite direction. Other features of the invention include limit switches associated with the drive bar and responsive to a certain distance of travel thereof for preventing the motor from overrunning the turning radius of the trailer steering wheels and a three-position switch for controlling the direction of current flow in the motor circuit which automatically returns to "off" position after manual force is released from the switch handle.

Various other objects, advantages and meritorious features of the invention will become more fully apparent from the following specification, appended claims and accompanying drawing figures, wherein:

BRIEF DESCRIPTION OF THE DRAWING

FIG. 1 is a plan view of a trailer chassis pivotally connected to a towing vehicle and illustrating a preferred form of the invention;

FIG. 2 is a vertical sectional view of the trailer chassis of FIG. 1 taken along line 2—2 thereof and illustrating the supporting arrangement and the mounting relationship of the electric motor and the drive bar with respect to the axle of the chassis carrying the pair of steerable wheels;

FIG. 3 is a detail view taken along line 3—3 of FIG. 1 and showing the provision for releasably locking the drive bar in the straight-ahead position of the pair of steerable wheels;

FIG. 4 is a sectional view taken along line 4—4 of FIG. 1 and showing the operating linkage effectively coupling the end of the drive bar to each steerable wheel of the trailer;

FIG. 5A is a schematic view of one form of an electric circuit for reversibly controlling the direction of current flow through the single winding of a motor for turning the steerable trailer wheels and such that the motor can be reversely rotated even though its preceding direction of rotation has overrun its prescribed limit and tripped a limit switch cutting off the current flow producing the preceding direction of rotation; and FIG. 5B is a schematic view of another form of an electrical circuit for operating a motor having two reversely wound windings.

DESCRIPTION OF A PREFERRED EMBODIMENT

Referring to FIG. 1 initially, there is shown a trailer vehicle generally indicated at 10 having a chassis frame 12 pivotally coupled by means of a tongue or draw bar 14 and a coupling provision 16 to the rear bumper 18 or other suitable part of a towing vehicle 20. The trailer chassis frame is resiliently supported on an axle 22 by means of a set of conventional leaf springs 24—24

(FIG. 2), and the axle in turn is supported from the ground by a pair of steerable wheels 26—26 swiveled by king pins or the like to the opposite ends of the axle.

The steering wheels 26—26 are connected together for joint turning movement from a straight-ahead position shown in full line in FIG. 1 to various angular positions on either side of the straight-ahead position, one such turned position of the wheels being shown in dashed outline in FIG. 1. In other words, the mechanism which connects the steerable wheels for joint movement is able to pivot these wheels in the direction to steer the trailer either to the right or to the left from an already assumed position. In the illustrated embodiment of the invention, such a mechanism takes the form of a reciprocally mounted bar 28 having rack teeth 30 for purposes to be described hereinafter which extends in slightly spaced parallel relation to the axle 22. Each end of the bar 28 is connected to the adjacent wheel 26 by a similar two-member linkage assembly which is sectionally shown in FIG. 3. One link of each linkage assembly is a radial or steering arm 32 fixed to each wheel for joint swiveling movement therewith and the other link is a short member 34 pivotally connected at its opposite ends to the steering arm 30 and the bar 28. The dashed and full line representations of these two members 30 and 32 of the linkage assemblies in FIG. 1 illustrate respectively the two angular positions assumed by the wheels 26—26 in their dash and full line positions illustrated in FIG. 1.

As earlier mentioned herein, the power source for effecting movement of the bar 28 is a reversible electric motor 36 which is carried by the trailer and particularly secured to the axle of the trailer to which the steerable wheels are pivoted. The electric motor 36 is preferably located between the axle 22 and the rack bar 28 and with the axis of the motor shaft extending parallel to the axle and bar. Preferably, as shown better in FIG. 2, the motor and rack bar are mounted on the upper side of a common supporting plate 38 with the teeth of the rack 30 facing upwardly so as to be engaged by a gear wheel 40 forming part of the reduction gearing associated with the electric motor. The rack bar 28 is free to slide on the supporting plate, but if desired additional provision in the form of a track may be provided for guiding the bar in its reciprocating motion. In the herein illustrated form of the invention, the rack bar 28 is guided in its reciprocal motion by a pair of spaced apart inverted u-shaped metallic clips or straps 42 which normally allow the bar 28 to slide in opposite directions therethrough. However, to hold the bar 28 from movement, such as when the wheels 26—26 are held in their straight-ahead position for normal road travel, the two clips 42—42 and the base plate 38 are provided with holes 44 and 46 which always align with one another, and which will also align with a pair of holes 48 in the rack bar 28 when the latter is in its central position with the steerable wheels 26—26 in straight-ahead position as shown in FIG. 3. When these parts are so positioned, a clevis pin 50 is dropped into the aligned holes of each assembly of clips, base plate and rack bar 28 thereby locking the rack bar from longitudinal movement as well as holding the clevis pins from accidental dislodgement in the manner illustrated in FIG. 4.

The supporting plate 38 may be secured to the axle 22 in any suitable manner, such as by a pair of u-shaped bolts 52—52 each of which straddle the axle 22 and cooperate with a plate element 54 for clampingly engaging the supporting plate 38 to the axle in the manner illustrated in FIG. 2. Not shown in the presence of two holes in the supporting plate 38 which are spaced apart the proper distance to receive the upstanding legs of the U-shaped bolts 52. In a similar manner, a pair of U-shaped bolts 56 and plate elements 58 individually clampingly secure the axle 22 to the leaf springs 24.

It is apparent that the supporting plate 38 underlies the electric motor 36, rack bar 28 and gear 40 and thereby forms a protective shield therefore in addition to its function as a common support for these operating parts. As illustrated in FIG. 1, the plate 38 has a substantial lateral extent for this purpose. Moreover, as shown in FIG. 2, the base of the electric motor 38 may be supported from the plate 38 by cushioning means in the form of resilient collars 60 or the like surrounding tie down bolts and contained under compression thereby. It is also apparent from FIG. 1 that the right angle gearmotor 36 illustrated therein is positioned on the base plate 38 so that the drive gear 40 is located in the exact center of the rack teeth section 30 of the drive bar 28 when the trailer wheels 26—26 are in straight-ahead towing position. This assures that equal pressures will be encountered by the gearmotor whether it is pushing the drive bar toward one or the opposite side of the trailer vehicle.

The electric motor 36 should be protected against the elements of the weather and preferably of the submersible waterproof type. This is especially true if the trailer is used for launching and servicing boats because under such circumstances, the motor is likely to be operated in submerged condition.

An important provision of the invention is capability of not only deriving power from the towing vehicle to operate the electric motor in the trailer but also of controlling the steering of the trailer from the towing vehicle by varying the direction of rotation of the electric motor. This is accomplished by an electric circuit which extends from the electric motor ultimately to the electric power source of the towing vehicle and which is designed with circuit features for reversely controlling the direction of rotation of the motor.

Referring to FIG. 5A, a single winding motor is connected by three leads 62, 64 and 66 to a three-position selector switch 68 preferably mounted on the steering column 70 of the towing vehicle and having a handle 72 capable of movement to three positions as shown in FIG. 5A. However, the selector switch 68 is provided internally with spring means, not shown, for resiliently urging the handle 72 to the middle of the three positions to which it can be moved so that when manual force is released from the handle it assumes its midposition as shown by the full-line position of the handle in FIG. 5A. In this position the switch 68 is ineffective to transmit current to the motor 36 on any one of the leads 62, 64 and 66. When the handle of the switch is turned to the upper dashed position shown in FIG. 5A it will cause the current to flow from the battery 74 of the towing vehicle through lead 62 and thence in one direction through the winding of the motor to lead 64 which is then grounded by the switch to the chassis of the towing vehicle. Similarly, when the handle is moved to the lower dashed position shown in FIG. 5A it will cause the current to flow from the battery 74 through lead 66 and thence in the opposite direction through the motor winding to now grounded lead 64. It is apparent that reversal of current flow through the motor winding will reverse the rotation of the motor and thus the direction of movement of the rack bar 28. It is also apparent that lead 64 acts as a common ground for the motor winding in either of the two active positions of the handle 72. As previously mentioned, once manual force is released from the handle 72, it returns to its ineffective midposition leaving the steerable wheels 26—26 in whatever adjusted position the operator of the towing vehicle has turned them as a result of his manipulation of the switch handle.

FIG. 5B illustrates a control circuit for an electric motor 76 having two reversely wound windings 78 and 80. Current from the battery 82 is delivered to a three position selector switch 84 having a movable part or handle which is spring urged to its full midposition shown in FIG. 5B. In its two remaining positions the switch either delivers the current along lead 86 to winding 78 or along lead 88 to winding 80 so long as manual force is exerted sufficient to overcome the spring provision for returning the handle to midposition.

A feature of the two control circuits of FIGS. 5A and 5B is the provision for limiting travel of the rack bar 28 beyond a desired distance in either direction, and accomplishing such operation without disturbing the ability of the electric motor to be reversely rotated so that it may be returned within its normal operating range. To this end a pair of similarly designed limit switches 90—90 are installed one in each of the motor leads 62 and 66 and located adjacent to the path of travel of the rack bar 28 as schematically illustrated in FIG. 5A. Each limit switch contains a contact member 92 spring urged to closed position so that current can flow to the motor. Secured to the side of the rack bar 28 and preferably longitudinally adjustable therealong are two projections 94—94 of wedge shape each of which is slotted to receive a bolt 96 for securement to the bar, the slot providing the aforementioned longitudinal adjustment feature. Each wedge shape projection is positioned on the rack bar facing towards its respective limit switch 90 and extends laterally sufficiently to abut and trip the contact member 92 of its switch to circuit open condition should the rack bar overtravel its desired limited distance in either direction of its motion. Opening one of the leads 62 or 66 in this fashion will terminate its usefulness as a conductor of current and the motor will immediately stop rotating in the direction it had been moving the rack bar. However, if the handle 72 of the selector switch is turned to the other extreme position of its movement it will cause the conduction of current through the remaining one of the two leads 62 or 66 thereby causing the motor to reverse its direction of rotation and return the rack bar within the operating range of its limited movement. In a similar manner, the limit switches 90'—90' of the circuit shown in FIG. 5B can be tripped to open position to stop further advance of the rack bar 28 in either direction of its motion.

Reversible electrical motors of the character suggested herein are available in the market. For example, various kinds of gearmotors are made and sold by the Bodine Electric Company of Chicago, Illinois, and described and illustrated in its Catalogoue S–5C bearing a notice of copyright 1972. Included in this catalogue are connection diagrams showing how leads to electric motors may be transposed in order to reverse direction of rotation of the motor.

Three-position selector switches of the character mentioned herein are also available on the market. For example, various types of such switches are made and sold by the Allen-Bradley Company of Milwaukee, Wis.

The separable electrical coupling 98 in the control circuit of FIG. 5A represents the dividing line between the towing vehicle 20 and the trailer vehicle. When the vehicles are to be detached from one another, the coupling 98 would first be separated into its two parts, one part being left in the towing vehicle such as within its trunk portion and the other part left with the trailer. For protection purposes the lead 100 from the battery 74 to the selector switch 68 may have a fuse or other form of circuit breaker 102 therein as shown in FIG. 5A.

While particular embodiments of the invention have been described and illustrated, it will be understood, or course, that it is not desired that the invention be limited thereto since additional modifications may be made. It is, therefore, contemplated by the appended claims to cover any such modifications as fall within the true spirit and scope of the invention.

What is claimed is:

1. A steering and control apparatus for a trailer having a frame supported upon at least one axle of the trailer and a pair of wheels pivoted thereto, the trailer adapted to be coupled to a towing vehicle, and comprising:

a reversible electric motor mounted upon said axle and operably connected to said pair of wheels for turning the same toward one side or the opposite side of the trailer;

an electric circuit connected at one end to the electric motor and connectable at the other end to the electrical power source of the towing vehicle;

switch control means incorporated into said circuit and mounted upon the towing vehicle, said switch control means being operable in one position to disconnect the motor from the electrical power source, operable in a second position to connect the motor to the electrical power source so that the electric current in the circuit operates the motor to pivot said pair of wheels in the direction to steer the trailer to the right of its already assumed position, and operable in a third position to connect the motor to the electrical power source so that the electric current in the circuit operates the motor to pivot said pair of wheels in the direction to steer the trailer to the left of its already assumed position;

said operable connection between the electric motor and said pair of wheels comprising a member movable along a path of travel extending parallel to the axle of the trailer upon which the motor is mounted and being connected by mechanical linkages to said pair of wheels to turn the same, and gear reduction means being operatively coupled between said motor and said member for effecting travel of the member in one or the opposite direction along said path depending upon the direction of rotation of the motor thereby to apply reversible turning movement to said pair of wheels;

said movable member being in the form of a rack bar having its teeth operatively engaged with a gear of said gear reduction means; and springs means interposed between the trailer frame and the trailer axle for yieldingly supporting the frame from said pair of wheels, and an approximately horizontal extending supporting plate mounted to said axle for serving as a common support for said motor and said rack bar.

2. The steering and control apparatus of claim 1 wherein the switch control means is a three-position switch having a single control arm sweepable over the three positions in succession but being resiliently urged from the first and third positions to the middle position therebetween, the middle position acting to disconnect the motor from the power source and the first and third positions acting to connect the motor to the power source such that the first position causes the motor to rotate in the direction to turn said pair or wheels toward one side of the trailer and the third position causes the motor to rotate in the opposite direction to turn said pair of wheels toward the opposite side of the trailer.

3. The steering and control apparatus of claim 2 wherein the switch control means is mounted upon the steering column of the towing vehicle.

4. The steering and control apparatus of claim 1 wherein a pair of limit switches are incorporated in the electric circuit such that one limit switch will be tripped when said pair of wheels are turned in one direction beyond a prescribed turning radius and that the other limit switch will be tripped when said pair of wheels are turned in the other direction beyond a prescribed turning radius.

5. The steering and control apparatus of claim 4 wherein the electric circuit is so designed that should said pair of wheels be turned in one direction beyond its prescribed turning radius and the limit switch associated with such turning direction be tripped, thereby terminating the flow of current to the motor to continue such direction of turn, the other limit switch is not affected thereby with the result that the motor may be reversely operated to return said pair of wheels within the prescribed turning radius which they had exceeded.

6. A steering and control apparatus for a trailer-type vehicle having a frame supported upon at least one axle of the trailer vehicle and a pair of wheels pivoted thereto and comprising:

a reversible electric motor mounted upon said axle and operably connected to said pair of wheels for turning the same toward one side of the opposite side of the trailer vehicle;

an electric circuit connected at one end to the electric motor and at the other end to a separable electrical coupling connected to an electrical power source contained in a towing vehicle;

switch control means incorporated into said circuit and having first, second and third positions over which a control arm is successively manually sweepable in opposite directions to control the operation of the electric motor, said control arm being operable in the first position to connect the motor to the electrical power source so that the electric current in the circuit operates the motor to pivot said pair of wheels in the direction to steer the trailer vehicle to the right of its already assumed position, said control arm being operable in the thrid position to connect the motor to the electrical power source so that the electric current in the circuit operates the motor to pivot said pair of wheels in the direction to steer the trailer vehicle to the left of its already assumed position, and said control arm being operable in the second or intermediate position to disconnect the motor from the electric power source thereby rendering the motor inoperable;

resilient means associated with said switch control means and disposed to yieldingly urge the control arm to move from said first or third position to said second position upon release of manual control over the arm; and said switch control means being mounted in the towing vehicle adjacent to the steering wheel thereof.

7. The steering and control apparatus of claim 6 wherein a pair of limit switches are incorporated in the electric circuit such that one limit switch will be tripped when said pair of wheels are turned in one direction beyond a prescribed turning radius and that the other limit switch will be tripped when said pair of wheels are turned in the other direction beyond a prescribed turning radius.

8. The steering and control apparatus of claim 7 wherein the electric circuit is so designed that should said pair of wheels be turned in one direction beyond its prescribed turning radius and the limit switch associated with such turning direction be tripped, thereby terminating the flow of current to the motor to continue such direction of turn, the other limit switch is not affected thereby with the result that the motor may be reversely operated to return said pair of wheels within the prescribed turning radius which they had exceeded.

* * * * *